United States Patent

Turpin et al.

Patent Number: 5,172,184
Date of Patent: Dec. 15, 1992

[54] ELECTROMAGNETIC DISTURBANCE FREE RING INTERFEROMETER

[75] Inventors: Marc Turpin, Bures Sur Yvette; Serge Botti, Viroflay; Didier Rolly, Marcoussis, all of France

[73] Assignee: Thomson-CSF, Puteaux, France

[21] Appl. No.: 623,899

[22] PCT Filed: May 4, 1990

[86] PCT No.: PCT/FR90/00320
§ 371 Date: Jan. 3, 1991
§ 102(e) Date: Jan. 3, 1991

[87] PCT Pub. No.: WO90/14577
PCT Pub. Date: Nov. 29, 1990

[30] Foreign Application Priority Data
May 19, 1989 [FR] France ............... 89 06579

[51] Int. Cl.⁵ .................................. G01C 19/72
[52] U.S. Cl. .......................... 356/350; 385/36
[58] Field of Search ................ 356/345, 350; 250/227.19, 227.27; 385/32, 36

[56] References Cited

U.S. PATENT DOCUMENTS

| | | | |
|---|---|---|---|
| 4,153,370 | 5/1979 | Corey | 356/358 |
| 4,596,466 | 6/1986 | Ulrich | 356/345 |
| 4,712,306 | 12/1987 | Cahill et al. | 356/350 |
| 4,729,622 | 3/1988 | Pavlath | 356/350 |
| 4,762,416 | 8/1988 | Lefevre et al. | 356/350 |
| 4,768,854 | 9/1988 | Campbell et al. | 385/36 |

FOREIGN PATENT DOCUMENTS 2941618 4/1981 Fed. Rep. of Germany.

Primary Examiner—Samuel A. Turner
Attorney, Agent, or Firm—Oblon, Spivak, McClelland, Maier & Neustadt

[57] ABSTRACT

The interferometer of the invention, of the type with an optical fibre in ring form, with a measuring head (16) connected to a distant processing center (18) by cables, has an optoelectronic detector (17) removed to the center and connected to the measuring head by a multimode optical fibre (19).

6 Claims, 2 Drawing Sheets

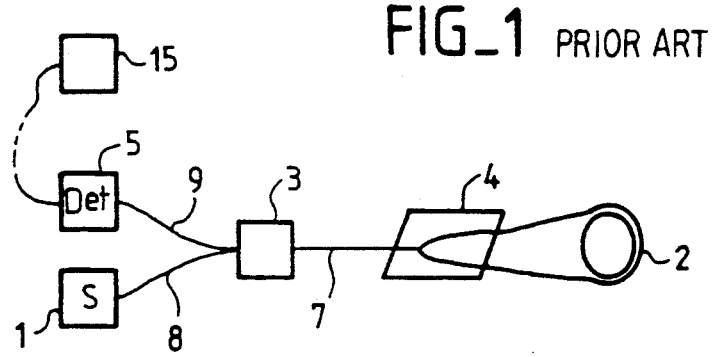
FIG_1 PRIOR ART
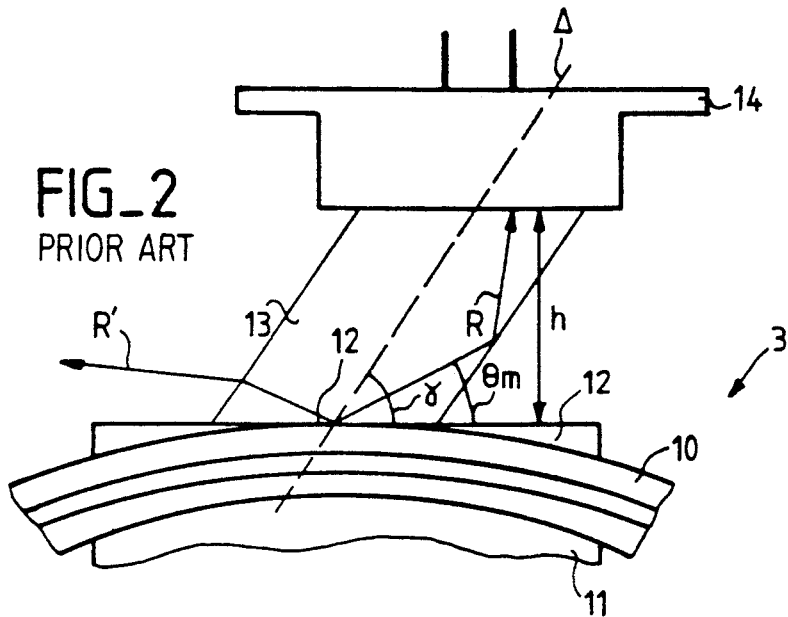
FIG_2 PRIOR ART
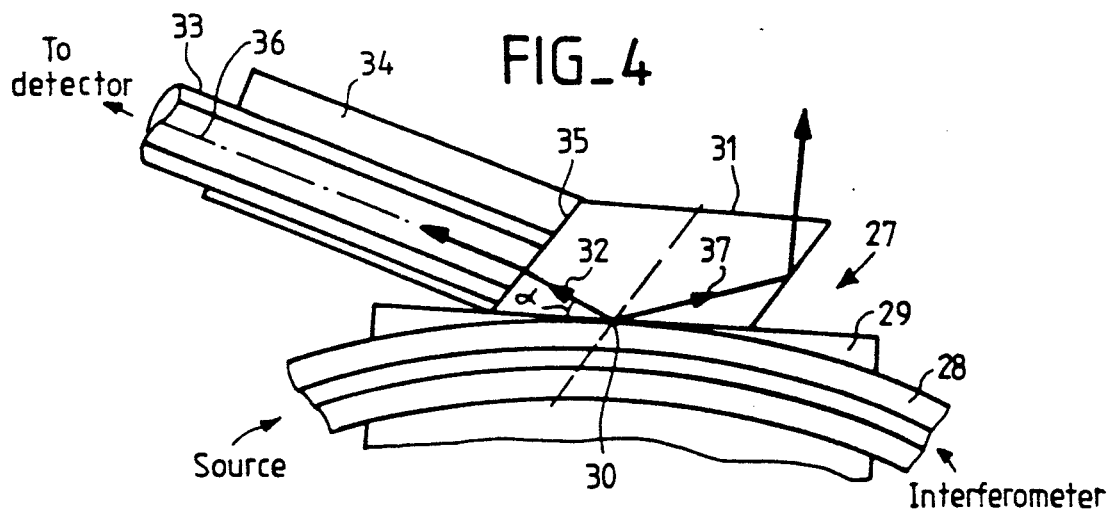
FIG_4

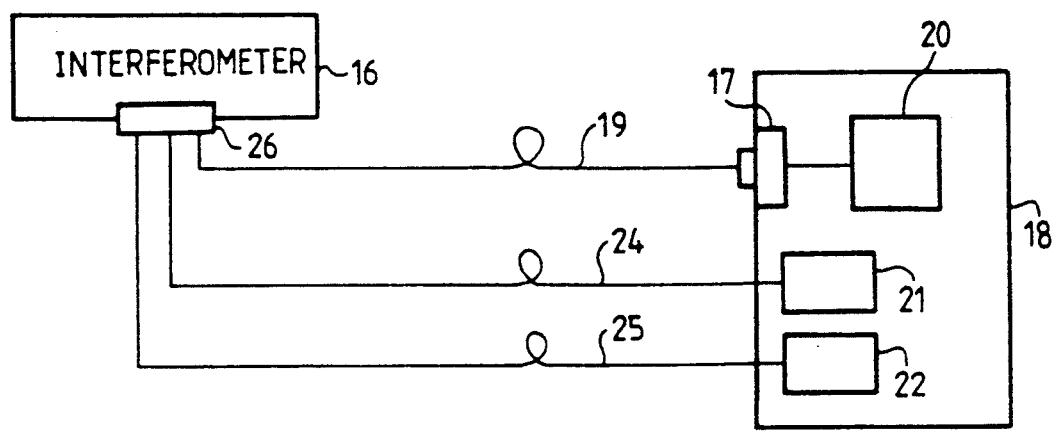
FIG_3
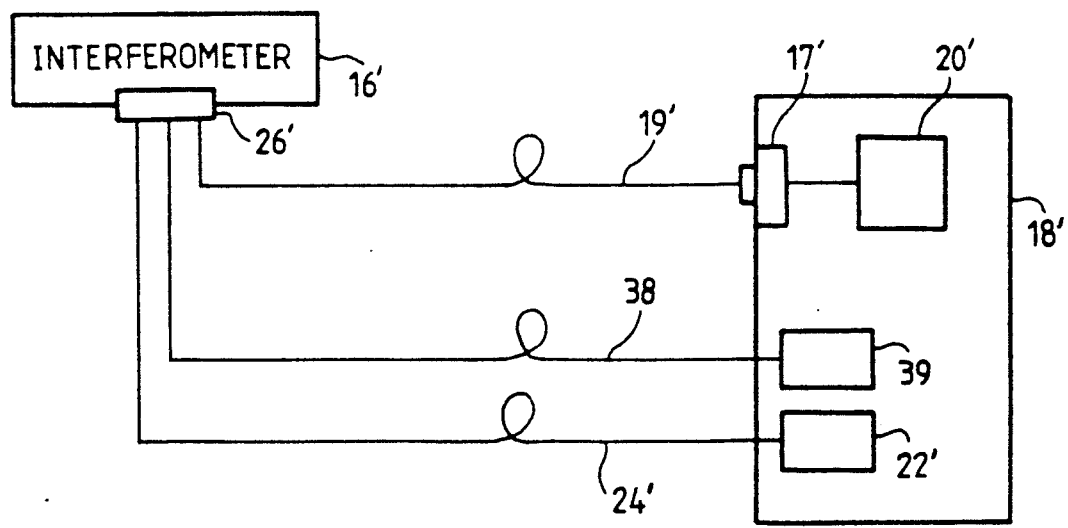
FIG_5

5,172,184

ELECTROMAGNETIC DISTURBANCE FREE RING INTERFEROMETER

BACKGROUND OF THE INVENTION

1. Field of the Invention

The present invention relates to a ring interferometer.

In certain interferometric systems, such as gyrometers, the use of a particular, so-called "minimum reciprocal" configuration enables exact cancelling of any phase shift other than those induced by non-reciprocal effects. These non-reciprocal effects are in particular the Faraday effect (colinear magneto-optic effect) and the Sagnac effect, according to which, by relativistic inertial effect, the rotation of the interferometer with respect to a Galilean reference frame destroys the symmetry of the propagation times.

Gyrometers with minimum reciprocal configuration are known. Particularly simple, this configuration comprises a splitting device, with three monomode gates, necessary to inject the incident light into the ends of a fibre optic loop constituting the sensing portion of the interferometer.

The single input-output section of the splitter constitutes a unimodal filter which ensures the perfect optical reciprocity of the system. According to one embodiment, the splitter is multifunctional: it ensures the mode filtering by polarising the light, and the modulation of the counter-rotating waves to enable the processing of the signal detected. The system furthermore comprises a light source and an optoelectronic detection device. According to a preferred embodiment of this known device, the various abovementioned elements are collected together in a single box of small size connected to the electronic monitoring device by a power supply cable and a transport cable for the information coming from the detector.

These electrical cables, even when they are well shielded, are subject to electromagnetic disturbance, which perturbs the measurements of the signals detected.

SUMMARY OF THE INVENTION

The subject of the present invention is an interferometer of the type in ring form with removed power supply and processing centre, this interferometer being the most compact possible and affording practically no risk of being perturbed by electromagnetic disturbances.

The interferometer according to the invention comprises an optoelectronic detector disposed at a distance from the measuring head and connected to the latter by an optical fibre. Preferably, this optical fibre is a multimode fibre.

According to an embodiment of the invention, the light source is also disposed at a distance from the measuring head and connected to the latter by an optical fibre.

BRIEF DESCRIPTION OF THE DRAWINGS

The present invention will be better understood on reading the detailed description of several embodiments illustrated by the attached drawing in which:

FIG. 1 is the simplified scheme of a ring interferometer of the prior art,

FIG. 2 is a sectional view of a light diverter used in the interferometer of FIG. 1, FIG. 3 is the simplified scheme of a ring interferometer according to the invention, FIG. 4 is a sectional view of a light diverter used in the interferometer of FIG. 3, and FIG. 5 is the simplified scheme of a variant of a ring interferometer according to the invention.

DETAILED DESCRIPTION OF THE PREFERRED EMBODIMENTS

An interferometric system of the ring type comprises, as represented in FIG. 1, a light source 1 connected to a fibre optic ring 2 via a diverter 3 and a splitter or input-output-gate 4. A detector 5 is also connected to the diverter 3.

The diverter 3 makes it possible to detect the useful light flux which returns from the ring 2, constituting the sensing portion of the interferometer, by sampling a portion of the light flux containing the phase shift information and to direct it towards the detector 5.

The reciprocity of the system is obtained if the section downstream of the diverter 3 is strictly monomode (in the spatial sense and in the sense of the polarisation), namely the section comprising the monomode optical fibres 2 and 7 (fibre 7 between diverter 3 and splitter 4) which are monomode (sic). Thus, the diverter 3 requires only two monomode gates for the connection by monomode optical fibre 8 with the source 1, and the input-output connection with the fibre 7. The connection 9 between the diverter 3 and the detector 5 may just as well be multimode as monomode.

The diverter 3 (FIG. 2) is for example produced with the aid of a monomode fibre 10 kept curved by sticking into an appropriate base 11. After local surface abrasion of this fibre and polishing of the face 12 thus obtained, a block 13 of material transparent to the wavelengths used and whose refractive index is greater than that of the fibre is stuck onto this face. Thus, a portion of the useful light flux (coming from the ring 2) transported by the fibre can be coupled to the outside. This flux propagates in the block 13 and is directed onto an optoelectronic detector 14 after reflection and focusing. The asymmetric geometry of the block 13 makes it possible to refract outside the field of the detector and outside the block (rays R') the portion of flux sampled in the source-interferometer sense. The multimode character of the propagation of the light waves between the diverter 3 and the detector 5 does not perturb the functioning of the interferometric system, which remains reciprocal overall.

The connection between the detector 14 and the distant centre 15 for processing the signals from the detector and for power supply is constructed from shielded electrical cable, this cable, often relatively long, being able to be disturbed by electromagnetic perturbations, as explained above.

The interferometric system according to the invention and schematised in FIG. 3 does not afford these risks of disturbance. In fact, the interferometer head 16 no longer comprises any optoelectronic detector, and the latter (17) is removed to the distant processing centre 18. The connection between the head 16 and the detector 17 is ensured by a fibre optic connection 19. This fibre 19 can just as well be multimode as monomode. Preferably, it is multimode, since in this case it requires simple and easy-to-apply connectors only.

The centre 18 essentially comprises an electronic device 20 for processing the signals issuing from the detector 17, a device 21 for producing modulation and feedback signals for the phase modulator of the head 16 and a device 22 for supplying energy for the light source, for regulation and for monitoring. All these elements being well known, will not be described in more detail (sic). The connection between the elements 21 and 22 and the head 16 is produced by shielded electrical cables 24,25 respectively. The cables 19,24,25 are connected to the head 16 by appropriate connectors 26.

The diverter 27 (FIG. 4) is produced from a monomode optical fibre 28 kept curved in a base 29. The fibre 28 is locally and superficially abraded at 30, then polished. A block 31 made from material of refractive index greater than that of the fibre 28 is stuck against this polished face. The geometry of the block 31 is such that the fraction 32 of useful light flux sampled from the fibre 28 is refracted along one face of this block. In the embodiment represented, the block 31 has a prismatic shape.

A multimode optical fibre 33, supported by a fixing sleeve 34 solidly fixed to the base 29, is placed in contact with the face 35 of the block 31 which receives the useful refracted beam 32. The fibre 33 has a wide guide core and is polished at its end and placed in contact with the block 31. The axis 36 of (axial) symmetry of the fibre 33 is aligned along the mean direction of the beam 32 to optimise the coupling of light energy (neglecting the angle of refraction of the beam 32 when it passes from the block 31 into the fibre 33). To ensure good optical coupling between the block 31 and the fibre 33, an adhesive, polymerisable in ultraviolet radiation and of appropriate refractive index, is used advantageously at their interface.

According to one embodiment, use is made of optical fibres based on doped silica the mean refractive index of which is n1=1.46, the block 31 having a higher index n2=1.52. Under these conditions, in accordance with the laws of refraction, the angle of escape $\theta$ m of the light in the block 31 (relative to the polished face of the fibre 28) is of the order of 16°. In this direction the diffraction is very weak, of the order of $10^{-3}$. By contrast, in the plane forming an angle m (sic) with the polished surface, the diffraction angle Alpha is of the order of 10° to 20°. This large angle (greater than 15°) does not conflict with effective coupling in a multimode optical fibre of conventional numerical aperture (the numerical aperture of an optical fibre is, by definition, the sine of the half-acceptance angle of the beam). In this case, $\sin \theta m = 0.25$.

According to the principle of the directional diverter, the light energy refracted outside the monomode fibre 28 in the opposite sense to the useful sense (rays 37) is not coupled in the multimode fibre 33 and does not worsen the signal-to-noise ratio of the interferometer.

The light flux 32 useful in the interferometric measurement by phase shift, and coupled in the fibre 33, is directed by the latter towards the remote detector 17. The coupling between the fibre 33 and the detector 17 is produced in a manner known per se.

The ring interferometer thus produced is essentially composed of the measuring head 16, the monitoring unit 18 and the connections 19,24,25, the optoelectronic detector (17) being disposed in the monitoring unit as close as possible to the amplifying stages (20), this reducing the sensitivity of the system to electromagnetic perturbations. The electrical connections between the measuring head and the monitoring unit are reduced to the connections specific to the light source and to the modulation and feedback connections. The signal useful for the measurement propagates in optical form, which affords guarantees of insulation to electromagnetic radiation, and limits disturbing interferences between the electrical connections. Of course, the connection between the head 16 and the monitoring unit 18 may be produced with a mixed, optical and electrical cable.

According to the embodiment of FIG. 5, the light source is removed outside the measuring head, by connecting it to the measuring head by a monomode fibre.

In fact, in inertial type optical gyrometry, the strictly monomode characteristic (in the spatial sense and in the polarisation sense) is a criterion of primary importance. Depending on the degree of precision required, the monitoring of the state of polarisation of the light flux coming from the source requires a polarisation-conserving monomode connection. For this reason, the connectors used on the monomode connection between the source and the interferometer must conserve the incident polarisation, which is the case for the known monomode connectors. Of course, it is then necessary to see to it that the polarisation axes of the connectors (or of the splices, as appropriate) are well aligned.

In the system of FIG. 5, the measuring head 16' is connected to the monitoring unit 18' by an electrical cable 24' and two optical fibres 19' and 38. The cable 24' makes it possible to apply the modulation and the feedback signals to the phase modulator (not represented) of the measuring head. The multimode fibre 19' ensures the optical connection between the interferometer and the detector 17' of the unit 18'. The linear-polarisation-conserving monomode fibre 38 ensures the optical connection between the source 39 (disposed in the unit 18') and the interferometer 16'. The unit 18' also comprises circuits 20' for processing the signal delivered by the detector 17'.

The device of FIG. 5 is advantageous because the detector 17' is as close as possible to the circuits 20' which process its signal, and because the light source 39 is also very near its power supply and regulation devices. In most applications, it is necessary to ensure temperature regulation of the light source, which is much easier to apply in the unit 18' which can be sufficiently remote from the measuring site, and therefore easily protectable from environmental attack, although the measuring head 16' risks being subjected to large temperature variations.

We claim:

1. A ring interferometer system comprising:
   a light source connected to a first input of a diverter;
   a fiber optic ring connected to a splitter which is in turn connected to said diverter;
   a detector means connected by an optical fiber to said diverter wherein said detector means is spaced from said diverter and wherein said diverter is a locally and superficially abraded, curved, monomode fiber which is polished and wherein said diverter further comprises a block of material having asymmetric geometry transparent to wavelengths from said source and wherein the refractive index of said transparent material is greater than that of said curved monomode fiber and said block is stuck against the polished curved monomode fiber with said optical fiber connecting said detector to said diverter being stuck against one face of said block.

2. The interferometer system according to claim 1, wherein said optical fiber is a multimode fiber.

3. The interferometer according to claim 1 further comprising a processing center containing said detector.

4. The interferometer system according to claim 3 wherein said light source is disposed in said processing center and connected to said diverter by means of a second optical fiber.

5. The interferometer system according to claim 4 wherein said second optical fiber is a monomode fiber.

6. The interferometer system according to claim 5 wherein said second optical fiber is a linear-polarization-conserving monomode fiber.

* * * * *